Figure 1:
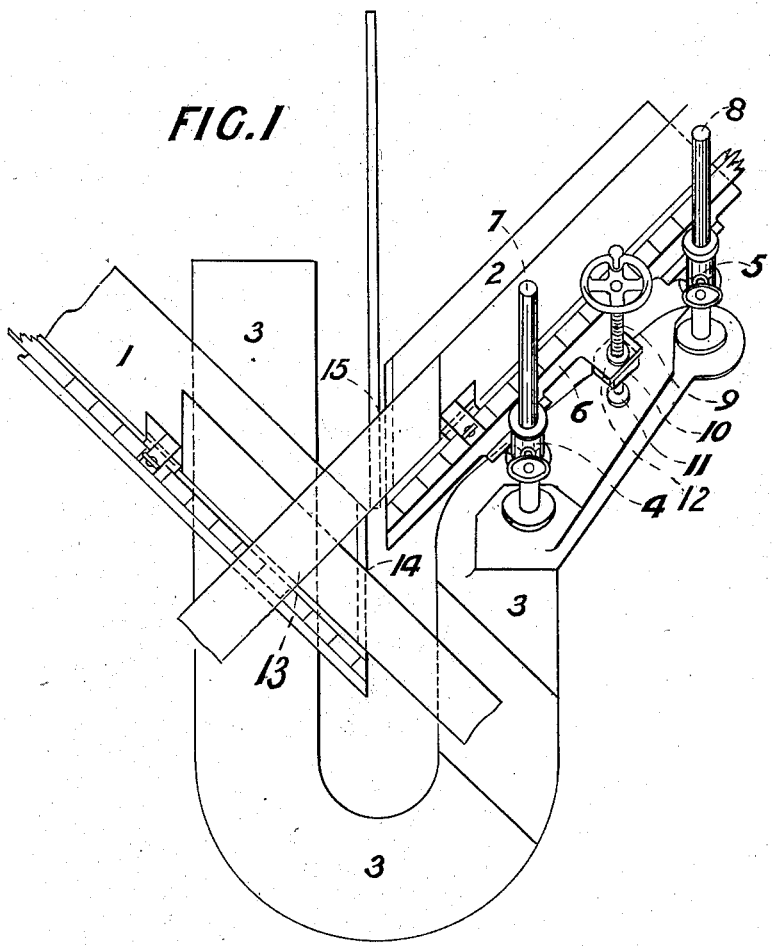

No. 752,730. PATENTED FEB. 23, 1904.
R. WALES.
ARM ADJUSTMENT FOR MITER CUTTING MACHINES.
APPLICATION FILED DEC. 29, 1903.
NO MODEL. 2 SHEETS—SHEET 1.

WITNESSES
INVENTOR
Robert Wales
BY
ATTORNEYS

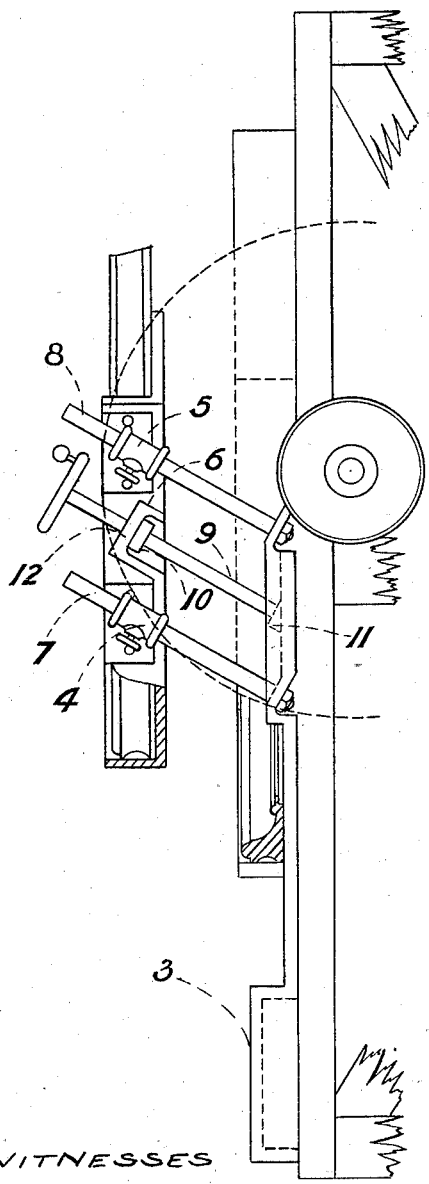

No. 752,730. Patented February 23, 1904.

UNITED STATES PATENT OFFICE.

ROBERT WALES, OF DUNEDIN, NEW ZEALAND.

ARM ADJUSTMENT FOR MITER-CUTTING MACHINES.

SPECIFICATION forming part of Letters Patent No. 752,730, dated February 23, 1904.

Application filed December 29, 1903. Serial No. 187,035. (No model.)

*To all whom it may concern:*

Be it known that I, ROBERT WALES, engineer, of Dunedin, New Zealand, have invented a certain new and useful Improved Arm Adjustment for Miter - Cutting Machines, of which the following is a specification.

The object of this invention is to provide a simple parallel adjustment vertically and horizontally in one movement for one of the arms of a miter-cutting machine in which pieces of molding are held crossed and in parallel planes and cut together. This object is effected by raising the arm in an inclined plane, which will give the required adjustment with sufficient accuracy for all practical purposes.

The invention consists of the features and combination and arrangement of parts hereinafter described, and particularly pointed out in the claims.

In the accompanying drawings the same numerals of reference indicate the same or similar parts.

Figure 1 is a plan of part of a mitering-machine comprising a base-piece, rests, and the parallel adjustment apparatus. Fig. 2 is an elevation of Fig. 1, showing the relation of the parts to a bench.

1 and 2 represent rests upon which the moldings required to be cut are placed. Rest 1 is fixed onto the base-piece 3, with its under surface resting on the bench. The rest 2 has brackets 4 and 5 attached to its back 6 at a particular angle determined according to the diameter of the saw used and the depth of the molding the machine is designed for cutting. Columns 7 and 8 are secured to the base-piece 3 at an angle equal to the angle at which the brackets 4 and 5 are secured to the back of the rests. The brackets are bored out and the columns are turned so that they are a perfect sliding fit. A screw 9 has its point inserted in a boss 11, and the nut 10 has its upper surface in contact with the under surface of a bracket 12, secured to the back of the rest 2. Revolving the screw 9 causes the nut 10 to travel upward, carrying the rest 2 with it until the rest is adjusted to the depth required to permit the moldings to pass each other at 13. The arm 2 will then have traveled toward the saw in an inclined plane, so that the edges 14 and 15 of the moldings will enter the saw nearly simultaneously.

Having now described my invention, what I claim as new, and desire to secure by Letters Patent, is—

1. In a miter-cutting machine of the class described mechanism for raising one of the arms in an inclined plane substantially as and for the purposes set forth.

2. In a miter-cutting machine of the class described a rest, brackets attached at an angle to the back thereof, a base-piece, columns secured thereto at said angle and slidable in said brackets, a threaded bracket on said rest, and a screw therein substantially as and for the purposes set forth.

In witness whereof I have hereunto set my hand in the presence of two witnesses.

ROBERT WALES.

Witnesses:
 A. J. PARK,
 EDITH W. BOTHAMBY.